United States Patent Office 3,429,833
Patented Feb. 25, 1969

3,429,833
WATER-SOLUBLE N,N'-DIGLYCIDYL COMPOUNDS AND CURABLE COMPOSITIONS COMPRISING SAID COMPOUNDS
Daniel Porret, Binningen, Switzerland, assignor to Ciba Limited, Basel, Switzerland, a Swiss company
No Drawing. Filed Feb. 9, 1967, Ser. No. 614,806
Claims priority, application Switzerland, Feb. 18, 1966, 2,425/66; June 17, 1966, 8,835/66
U.S. Cl. 260—2      4 Claims
Int. Cl. C07d 51/36, 49/34; C08g 51/18

ABSTRACT OF THE DISCLOSURE

New water-soluble N,N'-diglycidyl compounds of the formula

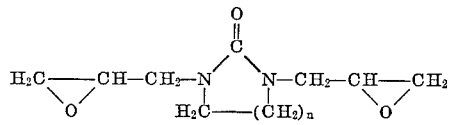

in which $n=1$ or 2, are prepared; an epihalohydrin is reacted in the presence of a catalyst, preferably of a tertiary amine, a quaternary ammonium base or a quaternary ammonium salt, with ethylene-urea or propylene-urea and in a second stage the product thus obtained is treated with a dehydrohalogenating agent. Said compounds are suitable for use in textiles. Curable composition comprising said compounds may be used as laminating resins, paints, lacquers, casting resins, coating compositions, adhesives, etc.

---

The present invention provides new, water-soluble N,N'-diglycidyl compounds of the formula (I)

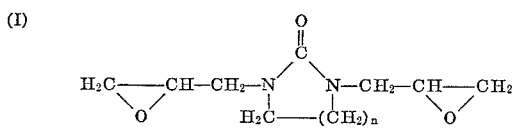

where $n=1$ or 2.

According to this invention the new diepoxides are prepared by reacting an epihalohydrin, preferably epichlorohydrin, in the presence of a catalyst, preferably a tertiary amine, a quaternary ammonium base or a quaternary ammonium salt, with a ethylene-urea or propylene-urea and treating the resulting product containing halohydrin groups in a second stage with a dehydrohalogenating agent.

Catalysts suitable for the addition of epichlorohydrin are above all tertiary amines such as triethylamine, tri-n-propylamine, benzyldimethylamine, N,N'-dimethylaniline and triethanolamine; quaternary ammonium bases such as benzyltrimethylammonium hydroxide; quaternary ammonium salts such as tetramethylammonium chloride, benzyltrimethylammonium chloride, benzyltrimethylammonium acetate and methyltriethylammonium chloride. Further suitable as catalysts are ion exchange resins containing tertiary or quaternary amino groups and ion exchange resins with acid amide groups.

As a rule, the dehydrohalogenation is carried out with strong alkalies such as anhydrous sodium hydroxide or aqueous sodium hydroxide solution, though it is also possible to use other strong alkaline reagents such as potassium hydroxide, barium hydroxide, calcium hydroxide, sodium carbonate or potassium carbonate.

Good yields are obtained by using an excess of epichlorohydrin. During the first reaction, before the alkali is added, partial epoxidation of the dichlorohydrin of the alkylene-urea already takes place. The epichlorohydrin, which acts as a hydrogen chloride acceptor, has then been partially converted into glycerol-dichlorohydrin.

The present process gives a particularly good yield of N,N'-diglycidyl-imidazolidone-2; this compound gives a completely clear solution in water and is distinguished by particularly favourable technical properties, especially when used as a textile and dyeing assistant.

The new diepoxides of the formula (I)

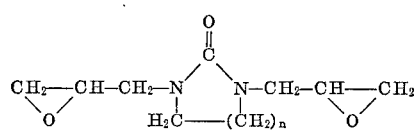

react with the usual curing agents for epoxy compounds and can, therefore, by the addition of such curing agents be cured or crosslinked respectively like other polyfunctional epoxy compounds or epoxy resins respectively. Both basic and acidic compounds may be used as such curing agents.

Good results have been obtained with amines and amides, such as aliphatic and aromatic primary, secondary and tertiary amines, for example para-phenylenediamine, bis (para - amino - phenyl)methane, ethylenediamine, N,N'-diethylethylenediamine, diethylenetriamine, tetra (hydroxyethyl) diethylenetriamine, triethylenetetramine, N,N-dimethylpropylenediamine; Mannich's bases such as tris (dimethylaminomethyl) phenol; dicyandiamide, melamine, cyanuric acid, urea-formaldehyde and melamine-formaldehyde resins; polyamides, for example those from aliphatic polyamines and dimerized or trimerized unsaturated fatty acids; polyphenols, for example resorcinol, bis (4-hydroxyphenyl)dimethylmethane; phenol-formaldehyde resins, reaction products of aluminum alcoholates or phenolates with compounds of tautomeric reaction of the acetoacetic acid ester type; Friedel-Crafts catalysts, for example $AlCl_3$, $SbCl_5$, $SnCl_4$, $ZnCl_2$, $BF_3$ and their complexes with organic compounds, for example $BF_3$-amine complexes; metal fluoborates such as zinc fluoborate; phosphoric acid; boroxines such as trimethoxyboroxine; polybasic carboxylic acids and their anhydrides, for example phthalic, tetrahydrophthalic, hexahydrophthalic, methylhexahydrophthalic, endomethylene-tetrahydrophthalic, methyl-endomethylene-tetrahydrophthalic anhydride (=methyl-nadic anhydride), hexachloro-endomethylene-tetrahydrophthalic, succinic, adipic, maleic, allylsuccinic, dodecenylsuccinic anhydride; 7-allyl-bicyclo-(2.2.1)-hept-5-ene-2,3-dicarboxylic anhydride, pyromellitic dianhydride, or mixtures of such anhydrides.

The anhydride curing may, if desired, be combined with the use of an accelerator, such as a tertiary amine, or a salt or quaternary ammonium compound thereof, for example tris(dimethylaminomethyl)phenol, benzyldimethylamine or benzyldimethylammonium phenolate, a tin-(II)salt of a carboxylic acid such as tin(II)octate or an alkali metal alcoholate, for example sodium hexylate.

The anhydride curing of the polyepoxides of this invention is advantageously carried out with the use of 0.5 to 1.1 gram equivalents of anhydride groups for every gram equivalent of epoxide groups.

The term "curing" as used in this context indicates the conversion of the above-mentioned diepoxides into insoluble and infusible, crosslinked products, generally accompanied by shaping operations to yield shaped products such as castings or mouldings or laminates, or flat structures such as lacquer films or cemented products.

If desired, the viscosity of the diepoxides of the present invention may be reduced by addition of an active diluent, for example butylglycide, cresylglycide or 3-vinyl-2,4-dioxaspiro(5.5)-9,10-epoxy-undecane.

The diepoxides of this invention may further be used in admixture with other curable diepoxy or polyepoxy compounds, for example: Polyglycidyl ethers of polyhydric alcohols or especially polyhydric phenols, such as resorcinol, bis(4-hydroxyphenyl)dimethylmethane (=bisphenol A) or condensation products of formaldehyde with phenols (novolaks); polyglycidyl esters of polycarboxylic acids, for example phthalic acid; aminopolyepoxides such as are obtained on dehydrohalogenating a reaction product of an epihalohydrin with a primary or secondary amine, such as aniline, or 4,4'-diaminodiphenylmethane, and also alicyclic compounds containing several epoxide groups, such as vinylcyclohexene dioxide, dicyclopentadiene diepoxide, ethyleneglycol bis(3,4-epoxy-tetrahydro-dicyclopentadien-8-yl)ether, 3,4-epoxy-tetrahydro-dicyclopentadienyl-8-glycidyl ether, (3',4'-epoxy-cyclohexylmethyl)-3,4-epoxy-cyclohexane carboxylate, (3',4'-epoxy-6'-methyl - cyclohexylmethyl) - 3,4 - epoxy - 6 - methyl - cyclohexane carboxylate, bis(cyclopentyl)ether diepoxide or 3-(3',4'-epoxy-cyclohexyl) - 2,4 - dioxaspiro(5.5) - 9,10-epoxy-undecane.

Accordingly, the present invention includes also curable mixtures suitable for the manufacture of shaped material including flat structures, containing the diepoxides of this invention, if desired in combination with other diepoxy or polyepoxy compounds and also curing agents for epoxy resins, such as polyamines or polycarboxylic acid anhydrides.

The diepoxy compounds of this invention, as well as their mixtures with other polyepoxy compounds and/or curing agents, may also be admixed at any phase prior to the curing operation with fillers, plasticizers, pigments, dyestuffs, flame inhibitors and mould lubricants.

Suitable extenders and fillers are, for example, asphalt, bitumen, glass fibres, cellulose, mica, quartz meal, alumina hydrate, gypsum, kaolin, ground dolomite, colloidal silica having a large specific surface (Aerosil) or metal powders, such as aluminium powder.

The curable mixtures may be used in the unfilled or filled state, if desired in the form of solutions or emulsions, as laminating resins, paints, lacquers, dipping resins, casting resins, moulding compositions, coating compositions, puttes, flooring compositions, potting and insulating compounds for the electrical industry, adhesives and also for the manufacture of such products.

By virtue of their solubility in water the new compounds of the formula (I)

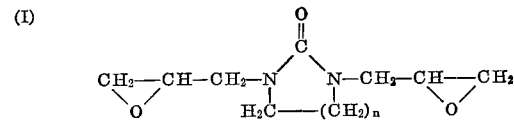

(wherein $n=1$ or 2) are particularly suitable for use in the textile sector, especially as dyestuff fixatives and as dressings on woven fabrics of all kinds, such as wool, super-polyamide fibres, acrylonitrile and above all regenerated or native cellulose or cellulose/polyester mixtures. The textile material may take the form of fibres, threads, flocks or preferably of woven or knitted fabrics.

The dyestuffs to be fixed are, quite generally, those which contain at least one active hydrogen atom which is preferably bound to a nitrogen, oxygen or sulphur atom. This includes the corresponding azo dyestuffs, metal complex dyestuffs, anthraquinone, azomethine, triphenylmethane, oxazine, dioxazine and tetrazaporphine dyestuffs, for example phthalocyanine dyestuffs, as well as the optical brighteners of the stilbenes of the benzimidazole, benzoxazole or benzothiazole series.

The active hydrogen atoms may be contained in primary or secondary amino groups, in heterocyclically bound NH-groups, in substituted or unsubstituted sulphonamide groups and in hydroxyl and/or sulfhydryl groups, or they may be formed in the dyebath.

Preferred dyestuffs are those which contain at least one group imparting solubility in water and at least one reactive amino group, the process being performed as described in French specification No. 1,120,142 (CIBA Case 3855).

Furthermore, the diepoxides of the formula (I)

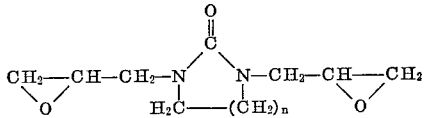

(where $n=1$ or 2) obtained according to this invention are also preferably used for fixing reactive dyestuffs, especially reactive dyestuffs that contain sulphato groups, such as sulphato-ethylsulphamide, sulphato-ethylsulphone, N-methylethionylamine and sulphato-ethylcarbonamide groups. Particularly valuable are dyestuffs containing thiosulphato groups, such as sulphamidoethylthiosulphato groups, and sulphur dyestuffs which are listed in the Color Index under the designation "C.I. solubilized sulphur dyes" and, in most cases, have been rendered soluble by esterification.

Finally, the diepoxides (I) lend themselves especially well to fixing water-soluble dyestuffs containing onium groups and optical brighteners; the onium groups may be ammonium, oxonium, hydrazinium or sulphonium or above all thiuronium groups.

The above-mentioned types of dyestuffs can be fixed by thermofixation or by wet storage, especially in the presence of thioureas.

Instead of using the new diepoxides of the formula (I)

(I)

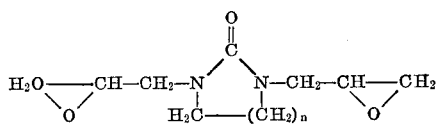

(where $n=1$ or 2) as the only reactive resin component for the fixation, they may be applied in admixture with other known curable resins, especially aminoplasts, for example condensation products of formaldehyde with melamine, with urea or with ethylene-urea, and it is of advantage to use those aminoplasts which display a minor tendency to retain chlorine.

The diepoxides of the Formula I of this invention may be used not only for fixing dyestuffs on textile materials but also for the manufacture of pigments in the mass in the absence of substrates by reacting them with the above-mentioned types of dyestuffs containing at least one active hydrogen atom or with optical brighteners as such, if desired or required in the presence of other crosslinking reactants, especially thiourea.

When fixing dyestuffs on textile substrates the impregnation or padding is carried out in the usual manner and in the usual apparatus known for dressing and dyeing textile materials. When so-called nozzle dryers are used, the drying and curing may be combined in a single process step.

According to a simple process for fixing the above-mentioned types of dyestuffs with the aid of diepoxides of the Formula I the textile material to be dyed is impregnated with a solution containing the dyestuff as well as the diepoxide of the Formula I, whereupon the material thus impregnated is subjected to a heat treatment in order to fix the dyestuffs. The fixing consists in heating or drying at 100 to 300° C. or alternatively in prolonged steaming. It is, however, advantageous first to fix the dyestuffs in the usual manner by dry heating at a temperature from 160 to 240° C., preferably from 190 to 200° C., provided the material to be dyed and/or printed allows of the use of such high temperatures. The duration of the fixing operation may vary within wide limits and depends on the type of dyestuff used, on the undyed polyfunctional compound, on the more or less strongly alkaline agents and of the material to be dyed and on the fixing temperature, and it is easy to determine by experiments. It is advantageous to fix the dyestuffs on textile material from cellulose by dry heating at 100 to 200° C.; within this temperature range the fixing of the dyestuffs is as a rule complete after about 1 to 5 minutes.

Alternatively, the material to be dyed or printed may first be padded with a dyestuff solution or printed with a printing paste that contains a suitable, water-soluble organic dyestuff, whereupon the printed or impregnated material is dried, after a possible steam or dry heat treatment padded with an aqueous solution containing a diepoxide of the Formula I of this invention and then again dried.

The dyestuff padding solution may contain in addition to the above-mentioned dyestuffs various additives, for example compounds that prevent migration (salts or alginates), solution promoters (soda, alkali lyes), wetting agents such as polyethyleneoxide condensates, hydrotropic substances (urea, formamide, sugar), if desired also reducing agents (especially when using vat dyes) such as sodium dithionite, thiourea dioxide, alkanesulphinates, alkali metal borohydrides, reductones such as triose or reductonates such as dihydroxyacetone.

After having been padded with the dyestuff solution the padded material is dried, if desired or required also steamed, or subjected to a thermofixation treatment.

The after-treatment of the material by steaming is carried out in a Mather Platt ager, in a continuous steamer at about 103 to 105° C., or in a star steamer at about 110 to 115° C.

The thermofixation may be carried out, for example, on a tenter at a temperature of, for example, about 130 to 240° C.

After having been dried, the material to be dyed or printed is padded with the solution of the diepoxide (I); this solution may contain additives, such as alkalies (soda, ammonia, sodium hydroxide solution) and if required or desired also oxidants (hydrogen peroxide, a perbonate or the like) which, for example, are used for the reoxidation of vatted dyestuffs.

Accordingly, the process of this invention may be carried out in one bath or in two baths, that is to say that padding may be performed with the dyestuff solution and the polyfunctional compound simultaneously or by treating the material to be dyed and/or printed successively, in the indicated order, with the dyestuffs and then with the diepoxide of the Formula I. In this last-mentioned (two-baths) variant it is preferable to treat the material with dyebaths or printing pastes that contain simultaneously an alkaline agent, the dyestuffs and hydrotropic compounds, especially thiourea. After this treatment the material is dried.

The diepoxides of the Formula I may be used together with dispersants in finely disperse form or as solution in water-miscible solvents. Suitable water-miscible solvents are above all dialkylcarbonic acid amides, such as dimethylformamide or dimethylacetamide, lactams such as N-methyl-2-pyrrolidone, ethers such as glycol ether or tetrahydrofuran, also alcohols such as methanol, ethanol or isopropanol, ketones such as acetone, and/or organic acids such as formic or acetic acid.

Apart from the dyestuffs mentioned and the diepoxides (I) the dyebaths and printing pastes and the solutions of the diepoxides (I) may also contain the conventional dyeing assistants or printing assistants, provided these assistants do not react in an undesired manner with the starting materials required for the performance of the present process. Such dyeing and printing assistants are, for example, surface-active compounds such as alkylsulphonates, or compounds that prevent the migration of the dyestuffs, such as sodium acetate, or agents that improve the solubility and the fixation of the dyestuffs, such as urea, or thickeners, for example an oil-in-water emulsion, a tragacanth thickening, alginates or methylcellulose.

The dyeings and prints obtained as described above are in general distinguished by their excellent wet fastness properties.

When water-insoluble dyestuffs are used in the present process, there are obtained dyeings and prints having remarkably good abrasion and solvent stability.

However, the present process not only produces dyeings and prints having substantially improved fastness properties—such as very good fastness to chlorine, atmospheric agencies and especially boiling in soda solutions—but, by virtue of the almost quantitive fixation of the dyestuffs it also offers the possibility of dispensing with rinsing and soaping, which is of importance as regards the apparatus required and the effluents. By virtue of the mild fixing conditions and the little aggressive agents used, it is also possible to use combinations with other types of dyestuffs (for example disperse dyestuffs for cotton/polyester mixed weaves), and in printing combinations with pigment dyes are not excluded.

The fixing or curing of the diepoxide (I) of this invention on textile material may alternatively be achieved by performing the impregnation in the presence of a catalyst dissolved in the aqueous liquor, which gives off acid at elevated temperatures, and after having been dried at an elevated temperature the material is hardened.

As curing catalysts capable of giving off acid at elevated temperatures there may be used, for example, ammonium salts of strong acids, such as ammonium chloride, ammonium sulphate or ammonium silicafluoride, or metals salts such as magnesium chloride, zinc nitrate, or preferably Friedel-Crafts catalysts such as aluminium chloride, boron fluoride and its complexes, especially zinc fluoborate.

The diepoxides (I) may alternatively be cured by adding thioureas such as thiourea, N-acetylthiourea or N-benzoylthiourea, N - methylthiourea or N - ethylthiourea, N-benzyl- or N-phenyl-, N,N'-dimethyl- or N,N'-diisopropyl-thiourea, tetramethylthiourea, thiohydantoin, thiobarbituric acid, ethylenethiourea or especially unsubstituted thiourea itself; again the curing temperature is advantageously within the range from 160 to 240° C. Hot-curing is especially indicated for fixing pigments with the aid of the diepoxides (I).

Furthermore, the diepoxides of the Formula I obtained by the present process may be used as crosslinking components for coating compositions based on copolymers containing in the polymer chain a small proportion of groups with active hydrogen atoms, especially free carboxyl groups. As such copolymers there are particularly suitable ternary or higher copolymers from (1) a small quantity of a free, simply unsaturated monocarboxylic acid containing a methylene group linked with the α-carbon atom, (2) a nitrile of such an acid, (3) an unsaturated ester and possibly a further comonomer that is free from acid groups. As acids (1) there are suitable acids such as methacrylic acid and above all acrylic acid. The nitrile (2) may be methacrylonitrile or preferably acrylonitrile. As polymerizable esters (3) there may be used esters of an unsaturated alcohol, especially vinyl-acetate, and alkyl, cycloalkyl, aryl or aralkyl esters of the acids (1). Copolymers containing the last-mentioned esters of the acids (1) have been described in French specification No. 1,053,510. The copolymers may be used in the form of aqueous dispersions or preferably of solutions in an organic solvent. To complete the crosslinking of the coplymers the coatings produced with the diepoxides (I) of this invention are thermofixed in the usual manner.

The diepoxides of the Formula I of this invention are also suitable as cements for the manufacture of unwoven textile-like materials, especially fibre fleeces or fibre mats, by cementing the fibres together at their points of contact. It is also possible to manufacture fibre fleeces or mixed fibre fleeces from cellulose fibres, such as cotton or spun rayon, cellulose acetate fibres, synthetic fibres such as polyamide fibres, polyester fibres or acrylonitrile fibres, also glass fibres, mineral fibres or slag fibres. Depending on the kind of fibres used the diepoxides of this invention may be used in the form of their solutions in water and/or in organic solvents, by themselves or in combination with curing agents or curing catalysts, and, if desired, with conventional assistants such as plasticizers, hydrophobizing agents, dyestuffs or pigments. The fibre fleeces or fibre mats are manufactured by known methods. Loose fibre fleeces are obtained, for example, in known manner by carding or by the random weaving method; if desired, they may be subjected to a pre-treatment by being pressed between hot rollers or sprayed with a small quantity of the cement and then heat-treated. The fibre fleece may then be treated with the solutions of the diepoxide (I) of this invention, using a known, conventional impregnating method, namely so that the fibres are cemented together where they cross and touch each other leaving the cavities between the fibres free or substantially free from impregnating substances. The binding agent can subesquently be fixed by heat treatment, for example with hot air or superheated steam or with contact heat, for example with the use of drying cylinders. Alternatively, fixing may consist in a shock-like heat treatment, for example with the aid of high-freuqency heat or of infrared heaters.

Percentages and parts in the following examples are by weight. The relationship between parts by weight and parts by volume is the same as that between the kilogram and the litre.

Example 1

A mixture of 215 g. of crude ethylene-urea (of 88% purity), 2313 g. of epichlorohydrin and 4 g. of benzyltrimethylammonium chloride was brought to the boil at 112° C. The formation of epoxide groups during this reaction was inspected by titration after removing the epichlorohydrin. After 3 hours, a resin had formed which contained 2.5 g. equivalents of epoxide per kg. The mixture was then cooled to 60° C., and within 30 minutes 240 g. of sodium hydroxide (97%) were added in portions. To maintain the temperature at 60° C., the flask was occasionally cooled. After addition of the sodium hydroxide the mixture was stirred on for 30 minutes at 60° C. The reaction product was concentrated under a pressure of 35 mm. Hg until the water of reaction formed had completely passed over azeotropically, then the salt formed was filtered off and washed with a small quantity of epichlorohydrin. The product was then further concentrated, at first under 20 mm. and then under 0.2 mm. Hg pressure to remove the last traces of volatile substances.

There were obtained 415 g. of N,N'-diglycidyl imidazolidone as a yellow, low-viscous resin which contained 8.5 gram equivalents of epoxide per kg. and 2.0% of chlorine. The product gave a completely clear solution in water.

Example 2

A mixture of 344 g. of crude ethylene-urea (of 88% purity), 3700 g. of epichlorohydrin and 3.2 g. of triethylamine was heated to the boil at 110° C. After 3 hours a resin had formed which contained 2.5 gram equivalents of epoxide per kg. The mixture was then cooled to 60° C., and within 30 minutes 340 g. of sodium hydroxide (of 97% purity) were added in portions, while maintaining the temperature at 60° C. by occasional cooling. The mixture was then stirred for another 30 minutes at 60° C. The reaction product was concentrated under 30 mm. Hg pressure until the water formed has passed over azeotropically. The salt was then filtered off and washed with a small quantity of epichlorohydrin. The product was then further concentrated, at first under 20 mm. Hg pressure to recover the epichlorohydrin, and then under 0.2 mm. Hg to remove the last traces of volatile substances.

There were obtained 662 g. of N,N'-diglycidyl imidazolidone-2 as a yellow, low-viscous resin which contained 8.5 gram equivalents of epoxide per kg. and 2.0% of chlorine. The product gave a completely clear solution in water.

Example 3

A mixture of 80 g. of propyleneurea, 1387 g. of epichlorohydrin and 1.6 g. of benzyltrimethylammonium chloride was heated to the boil at 115° C. After 4 hours, another 0.8 g. of benzyltrimethylammonium chloride was added. After another 6 hours the mixture was cooled and a small quantity of unreacted propylene-urea was filtered off. The filtrate was heated to 60° C., and within 30 minutes 70 g. of sodium hydroxide of 97% purity were added in portions. The reaction product was then concentrated under 75 mm. Hg pressure until all water formed had passed over azeotropically. The salt was then filtered off and washed with a small quantity of epichlorohydrin. The product was then further concentrated, at first under 20 mm. Hg pressure to recover the epichlorohydrin and then under 0.2 mm. Hg to remove the last traces of volatile substances.

There were obtained 164 g. of N,N'-diglycidyl-2-oxohexahydropyrimidine as a brown, clear liquid which contained 5.2 epoxide equivalents per kg. and was soluble in water.

Example 4

100 parts of the curing agent hexahydrophthalic anhydride were dissolved in 100 parts of the N,N'-diglycidyl-imidazolidone-2 described in Example 1, and this casting resin was poured at 80° C. into aluminum moulds (40 x 10 x 140 mm.; 130 x 130 x 4 mm.), allowed to gel for 4 hours at 80° C. and then finally cured by being heated for 12 hours at 120° C. The cured casting possessed the following properties:

Flexural strength (VSM 77103) (deflection 9.3 mm.) _____ kg./mm.$^2$__ 17.9
Impact strength (VSM 77105) _____ c. kg./cm.$^2$__ 8.1
Heat distortion point according to Martens, DIN, in ° C. _____ 94
Tracking resistance (VDE 0303) _____ Stage KA 3b
Arc resistance (VDE 0303) _____ Stage L4

Example 5

20 parts by weight of the dyestuff of the formula

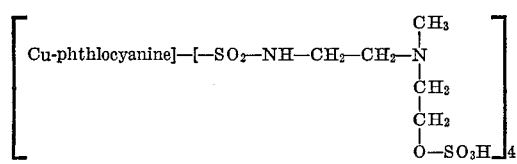

were dissolved in 850 parts by weight of water, 50 parts by weight of ethanol and 3 parts by weight of 10 N-sodium hydroxide solution, and 100 parts of a 20% aqueous solution of the N,N'-diglycidyl imidazolidone-2 obtained in Example 1 were added. This solution was used for impregnating a mercerized cotton fabric which was then squeezed to a weight increase of 70%, dried for 60 seconds at 180° C. and then thermofixed for 60 seconds at 200° C. A blue dyeing was obtained which was fast to washing.

When 20 parts by weight of the dyestuff of the formula

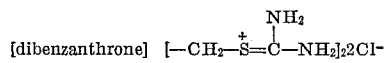

in 900 parts by weight of water were used, the epoxy compound was added, and the procedure described above was adopted, a fast dark blue shade was obtained.

Example 6

An aqueous coating composition was prepared from 100 parts by weight of a 50% aqueous dispersion of a copolymer from 85% of isobutylacrylate, 10% of acrylonitrile and 5% of acrylic acid, and 3 parts by weight of ammonia. On addition of ammonia the mixture thickened. Then 4.5 parts by weight of the N,N'-diglycidyl imidazolidone-2 obtained in Example 1 and 50 parts by weight of petroleum spirit ("white spirit"), were stirred in. A brushable, thick product was obtained which was well suited to coating fabrics on a doctor finishing machine; this product was used to apply 1 or 2 layers on an air doctor machine to fine fabrics of different kinds on one and both sides. After having coated the fabric, it was dried at 100° C. and then thermofixed for 5 minutes in a hot air apparatus at 150° C.

The coating weight was adjusted so that the weight of the dry coating was about 15 g. per m.² of fabric. The resulting coatings were very waterproof and fast to washing and solvents.

Instead of fixing the coatings by heat-treatment this may also be achieved by simply storing them at room temperature for 10 to 15 days.

Example 7

By mixing 100 parts by weight of a mixture of 60% of ethylacetate and 40% of a copolymer from 30% of vinylacetate, 65% of butylacrylate and 5% of acrylic acid, with 4.5 parts by weight of N,N'-diglycidyl imidazolidone-2 and 25 parts by weight of ethylacetate a viscid coating composition dissolved in organic solvents was prepared which was applied as in Example 6 to fine fabrics of different kinds and fixed on them. The resulting dry coatings were pliable, waterproof and fast to washing and solvents.

As shown in the following table the coatings obtained as described in Examples 6 and 7 were compared with the coatings produced without addition of the N,N'-diglycidyl-imidazolidone of this invention. The substrate used was a fine polyamide fabric weighing 70 g. per m.².

TABLE

| Specimen | A | B | C | D |
|---|---|---|---|---|
| Acrylic acid copolymer according to Example 6, grams | 100 | 100 | | |
| Acrylic acid copolymer according to Example 7, grams | | | 100 | 100 |
| N,N'-diglycidyl-imidazolidone-2, g. | | 4.5 | | 4.5 |
| White spirit | 50 | 50 | | |
| Ethylacetate, grams | | | 25 | 25 |
| Weight of dry coating in g./m.² after application of 2 coats on one side | 15 | 15 | 15 | 15 |
| Assessment of specimens | A | B | C | D |
| Washing fastness after 3 SNV-washes | (¹) | Good | (¹) | Good |
| Loss of coating in percent after treatment with trichloroethylene | >25 | 3.2 | >40 | 3.7 |

¹ Coated side swelled.

I claim:

1. Water-soluble N,N'-diglycidyl compounds of the formula

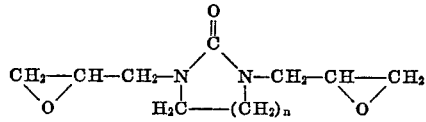

in which $n$ is an integer of at least 1 and at most 2.

2. N,N'-diglycidyl-imidazolidone-2.

3. N,N'-diglycidyl-2-oxo-hexahydropyrimidine.

4. A curable composition of matter comprising (1) an N,N'-diglycidyl compound of the formula

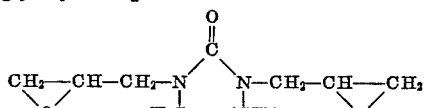

in which $n$ is an integer of at least 1 and at most 2, and (2) a curing agent for epoxy resins.

No references cited.

WILLIAM H. SHORT, *Primary Examiner.*

T. PERTILLA, *Assistant Examiner.*

U.S. Cl. X.R.

117—161; 161—184; 260—9, 37, 78.4, 251, 309.7, 830, 831, 834, 836